(12) United States Patent
Dunn

(10) Patent No.: US 11,143,356 B2
(45) Date of Patent: Oct. 12, 2021

(54) SUPPORTS AND SECUREMENTS FOR CAMERAS, LIGHTING AND OTHER EQUIPMENT, AND NOVEL COUPLERS AND ACCESSORIES FOR SAME

(71) Applicant: North Rim Investment Group Ltd., Winnipeg (CA)

(72) Inventor: Chris A. Dunn, Winnipeg (CA)

(73) Assignee: North Rim Investment Group Ltd., Winnipeg (CA)

( * ) Notice: Subject to any disclaimer, the term of this patent is extended or adjusted under 35 U.S.C. 154(b) by 0 days.

(21) Appl. No.: 16/653,311

(22) Filed: Oct. 15, 2019

(65) Prior Publication Data

US 2020/0116295 A1    Apr. 16, 2020

Related U.S. Application Data

(60) Provisional application No. 62/745,876, filed on Oct. 15, 2018.

(51) Int. Cl.
| | |
|---|---|
| *F16M 11/00* | (2006.01) |
| *F16M 11/14* | (2006.01) |
| *F16M 11/24* | (2006.01) |
| *F16M 13/04* | (2006.01) |
| *F16M 11/16* | (2006.01) |

(Continued)

(52) U.S. Cl.
CPC ............ *F16M 11/14* (2013.01); *F16B 2/205* (2013.01); *F16M 11/16* (2013.01); *F16M 11/247* (2013.01); *F16M 13/04* (2013.01); *F16B 1/00* (2013.01); *F16B 47/00* (2013.01); *F16B 2001/0035* (2013.01); *F16M 13/022* (2013.01);

(Continued)

(58) Field of Classification Search
CPC ....... F16B 2/205; F16M 11/247; F16M 13/04; F16C 11/106
See application file for complete search history.

(56) References Cited

U.S. PATENT DOCUMENTS

| 6,651,347 B2 | 11/2003 | Uhl |
| 6,702,482 B2 | 3/2004 | Sherwin |

(Continued)

FOREIGN PATENT DOCUMENTS

EP    1407152    3/2007

*Primary Examiner* — Amy J. Sterling
(74) *Attorney, Agent, or Firm* — Kyle R Satterthwaite; Ryan W Dupuis; Ade & Company Inc.

(57) ABSTRACT

Unique securement devices, usable for example as tripod feet, each feature a bistable spring band encapsulated in an outer skin with a set of optionally magnetic embedments discretely spaced along the band, and a coupler at one end for attachment to a tripod leg or other component. Unique ball and socket joints employ both a snap fit and a secondary retention mechanism to reliably secure together various components, including said securement devices and tripod legs. One joint includes an externally convex and internally concave ball coupler for optional mating with either a larger socket coupler or smaller ball. One joint includes a stabilization sleeve for angularly locking the ball and socket joint. An elongated support, usable as a tripod leg for example, features threaded connection ports usable to either directly mount threaded third-party componentry, or to receive a threaded ball coupler by which socket-equipped componentry can be indirectly attached.

13 Claims, 10 Drawing Sheets

(51) Int. Cl.
*F16B 2/20* (2006.01)
*F21V 21/00* (2006.01)
*F16B 1/00* (2006.01)
*F16M 13/02* (2006.01)
*G03B 17/56* (2021.01)
*F16B 47/00* (2006.01)
*H04N 5/225* (2006.01)

(52) U.S. Cl.
CPC ............ *F21V 21/00* (2013.01); *G03B 17/561* (2013.01); *H04N 5/2252* (2013.01)

(56) References Cited

U.S. PATENT DOCUMENTS

| | | |
|---|---|---|
| 2012/0114412 A1 | 5/2012 | Sokolihs et al. |
| 2012/0175394 A1 | 7/2012 | Keune |
| 2012/0223199 A1* | 9/2012 | Abri .................... F16M 13/022 248/280.11 |
| 2019/0093702 A1* | 3/2019 | Tiefenbrunn ......... F16C 11/106 |
| 2019/0170185 A1* | 6/2019 | Josten ................ F16M 11/2014 |
| 2019/0175224 A1* | 6/2019 | Doubler ............. A61B 17/7002 |

* cited by examiner

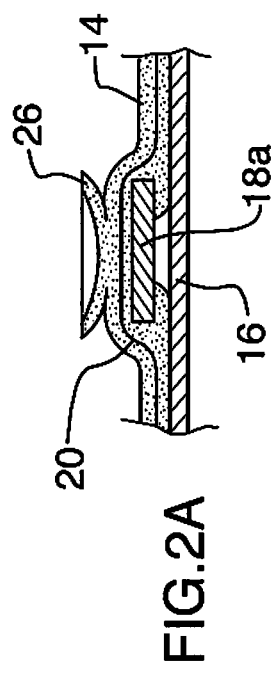
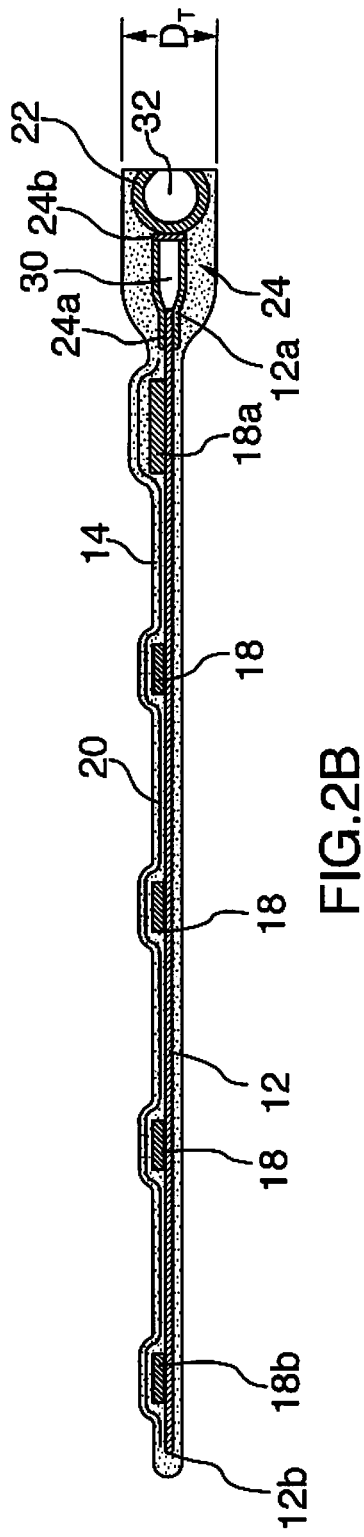
FIG.2A
FIG.2B

SUPPORTS AND SECUREMENTS FOR CAMERAS, LIGHTING AND OTHER EQUIPMENT, AND NOVEL COUPLERS AND ACCESSORIES FOR SAME

CROSS-REFERENCE TO RELATED APPLICATIONS

This application claims benefit under 35 U.S.C. 119(e) of U.S. Provisional Application No. 62/745,876, filed Oct. 15, 2018, the entirety of which is incorporated herein by reference.

FIELD OF THE INVENTION

The present invention relates generally to tripods, monopods and other supportive means for camera and lighting equipment, but also extends to other mechanical fields that may similarly benefit from the inventive products and methodologies disclosed herein.

BACKGROUND

With advances in digital photography and videography equipment, the widescale adoption of smartphone technology incorporating such photographic and videographic capabilities, and the explosive growth of online distribution channels through which photographic and videographic content is easily posted and widely shared, there exists notable demand for user friendly, flexible, adaptable camera support equipment usable by professional and amateur photographers and videographers to provide stable camera support for quality shots in various environments from various viewpoints.

In response, Applicant has developed unique tripod products and associated componentry and accessories that address this need in the marketplace, and that posses inventive features also useful for other applications outside the field of camera and lighting equipment.

SUMMARY OF THE INVENTION

According to one aspect of the invention, there is provided a securement device for coupling an item or assembly to a surface or object, said device comprising a bi-stable spring band, an outer skin encapsulating at least a substantial portion of the bi-stable spring band, and at least a first set of embedments at least partially encapsulated inside the outer skin with said bi-stable spring band, said first set of embedments residing at discrete locations along a length of said bi-stable spring band.

According to another aspect of the invention, there is provided a securement device for coupling an item or assembly to a surface or object, said device comprising a bi-stable spring band, a plurality of securement elements connected thereto at discrete locations therealong on a same side thereof for use in securing the device to said surface or object, and a coupler connected to the bi-stable spring band to enable selective coupling of said securement device to the item or assembly via a mating coupler provided thereon.

According to another aspect of the invention, there is provided a securement device for coupling an item or assembly to a surface or object, said device comprising a bi-stable spring band, an outer skin encapsulating at least a substantial portion of the bi-stable spring band, and a coupler situated adjacent a respective end of the bi-stable spring band and connected thereto to enable selective coupling of said securement device to the item or assembly via a mating coupler provided thereon, wherein said coupler is partially encapsulated by the outer skin.

According to another aspect of the invention, there is provided a snap fit ball and socket joint comprising:

a ball coupler having a ball tip with a spherically contoured exterior surface;

a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and a secondary retention mechanism operable to engage between the couplers when the ball tip is received in the socket coupler, thereby providing supplementary resistance to said separation of the couplers from one another.

According to another aspect of the invention, there is provided a support system for cameras, lighting or other equipment comprising:

a set of legs for use in erecting a tripod or other support structure, each leg having a leg-carried ball or socket coupler at a foot end thereof for selective connection of a respective foot thereto; and at least one set of feet, each having a foot-carried ball or socket coupler thereon of matable compatibility with the leg-carried ball or socket couplers on the legs;

wherein the leg-carried ball or socket couplers and the foot-carried ball or socket couplers are dimensioned to provide snap-fit mating therebetween to enable quick attachment of said feet to said legs.

According to another aspect of the invention, there is provided a support system comprising:

support components assemblable to form a camera support structure on which a camera is mountable, at least one of said support components having thereon at least one threaded connection port of a standardized thread type commonly used in camera-related equipment to enable attachment of third-party equipment to said camera support structure; and at least one selectively attachable coupler having a threaded base portion of said standardized threading type for selective mated connection of said threaded base with any of said threaded connection ports, and a ball or socket coupling portion attached to said threaded base portion; and at least one accessory having a ball or socket coupler thereon of matable compatibility with the ball or socket coupling portion of any of the selectively attachable couplers;

whereby at any of said threaded connections ports, the camera support structure is capable of either accepting direct threaded coupling of a third-party piece of equipment having said standardized thread type, or accepting indirect ball and socket coupling of said accessory to the support structure via the selectively attachable coupler.

According to another aspect of the invention, there is provided a system of assemblable components matable together via ball and socket joints, said system comprising:

a first component having thereon a dual-mode coupler having a convexly contoured exterior surface of a first ball size and a concavely contoured interior socket open at one end thereof;

a second component having thereon a socket coupler of a first socket size compatible with said first ball size to enable receipt of the dual-mode coupler in the socket coupler to form a first size of ball and socket joint between said first and second components; and a third component having thereon a ball coupler having a convexly contoured exterior surface of a second ball size that is smaller than the first ball size of the dual-mode coupler, and is compatibly sized with the interior socket of the dual-mode coupler to enable receipt of the ball coupler in the interior socket of the dual-mode coupler to form a second smaller size of ball and socket joint between said first and third components;

whereby either the second or third component is selectively connectable to the first component through the dual-mode coupler thereof.

According to another aspect of the invention, there is provided a ball and socket joint comprising:

a ball coupler having an externally convex ball tip projecting axially from a body to which said ball tip is attached;

a socket coupler having a concavely contoured socket opening thereinto from an end thereof to accommodate insertion of said externally convex ball tip into said socket to place the socket coupler and the ball coupler in a snap-fit mated condition with one another; and a stabilization sleeve selectively displaceable relative to the socket coupler and the ball coupler, while in said snap-fit mated condition, between an extended stabilizing position spanning around both of the couplers to thereby constrain angular tilting therebetween, and a retracted position withdrawn from around at least one the couplers to thereby allow said angular tilting therebetween.

According to another aspect of the invention, there is provided a leg component for use in supporting a camera, lighting or other equipment, said leg component comprising:

an elongated leg having opposite terminal ends;

one or more leg-carried couplers attached or attachable to said elongated leg at respective positions situated intermediately of said terminal ends of the leg, and by which one or more accessories having compatible accessory-carried couplers are removably and selectively mountable to said leg for storage or use of said accessory on said leg.

According to another aspect of the invention, there is provided a camera or lighting support comprising:

at least one elongated leg having opposing terminal ends; and a respective securement device connected or connectable to each elongated leg at or adjacent one of the terminal ends thereof;

wherein each securement device comprises at least one bi-stable spring band.

According to another aspect of the invention, there is provided a device comprising a plurality of bi-stable spring bands residing in parallel relation and at least partially overlying relation to one another.

BRIEF DESCRIPTION OF THE DRAWINGS

Preferred embodiments of the invention will now be described in conjunction with the accompanying drawings in which:

FIG. 2A is partial cross-sectional view of a variant of the bi-stable securement device, as viewed in the same cutting plane as FIG. 2.

FIG. 2B shows a variant of the bi-stable securement device of FIG. 2.

DETAILED DESCRIPTION

Figure 1:
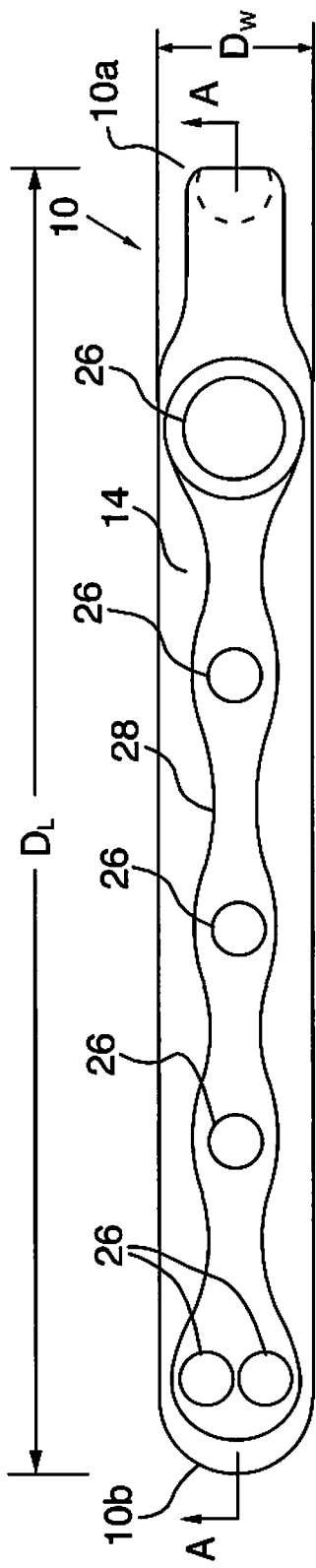
FIG. 1 is a top plan view of a bi-stable securement device useable, for example, as a support foot on a respective leg of a camera or lighting tripod.
Figure 2:
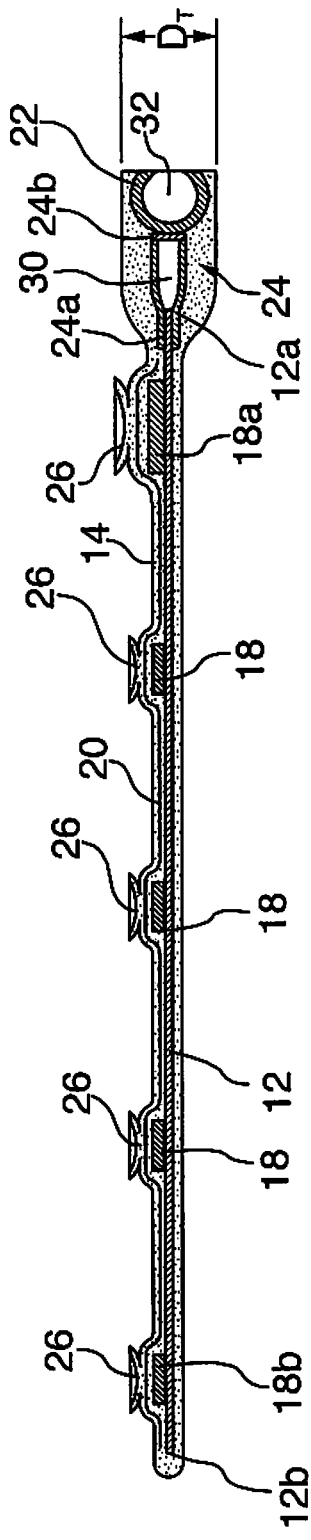
FIG. 2 is a cross-sectional view of the bi-stable securement device of FIG. 1, as viewed along line A-A thereof.
Figure 3:
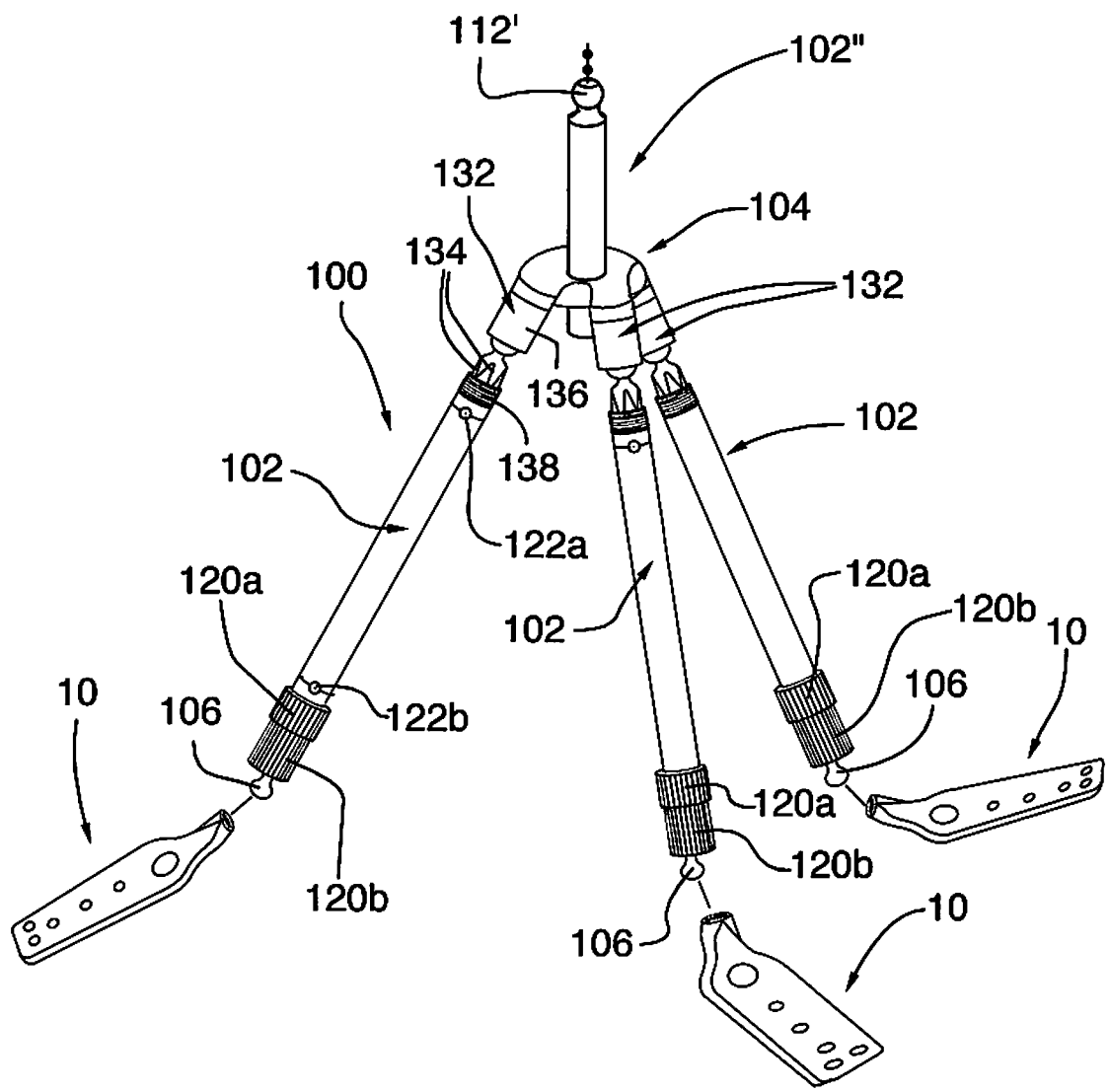
FIG. 3 is an elevational perspective view of a tripod whose legs are each equipped with a ball coupler at a lower distal end for mating with a cooperative socket coupler of the securement device of FIGS. 1 and 2 to establish a ball and socket joint therebetween.

FIGS. 1 and 2 illustrate an inventive securement device 10, which as further illustrated in FIG. 3 may be used, in a non-limiting example, as a foot on a respective leg of a camera or lighting tripod 100. In the illustrated embodiment of FIGS. 1 and 2, the securement device comprises a bi-stable spring band 12, a resiliently flexible outer skin 14 encapsulating an entirety of the bi-stable spring band, a plurality of embedments 18, 18a, 18b secured to the bi-stable spring band 12 and encapsulated fully within the flexible outer skin 14 in sandwiched relation between the spring band and the outer skin 14, an optional reinforcement layer 20 embedded within the outer skin 14, a socket coupler 22 situated at a proximal end of the securement device 10, and an internal stiffener/dampener 24 connected between the socket coupler 22 and a proximal end of the spring band 12 nearest thereto.

The securement device 10 is of elongated form having a length dimension DL that is measured along a longitudinal axis $A_L$ between opposite proximal end distal ends 10a, 10b of the device, and that exceeds both a lesser width dimension $D_W$ and even lesser thickness dimension $D_T$ of the device. The width dimension $D_W$ and thickness dimension $D_T$ are measured perpendicularly of the longitudinal dimension and perpendicularly of one another. The bi-stable spring band 12 runs a substantial length of the device, thus having a distal end 12b situated in close proximity to the distal end 10b of the securement device 10. At its longitudinally opposing proximal end 12a, the spring band 12 terminates at a greater distance from the proximal end 10a of the device 10 in order to leave room to accommodate the stiffener/dampener 24 and the socket coupler 22 between the proximal end of the spring band and the proximal end of the device.

In a known manner, the bi-stable spring band 12 is stable in two different states of shape, namely a linear state in which the length of the band measured on the longitudinal axis $A_L$ between the band's proximal and distal ends 12a, 12d is a linear measure made in a flat plane, and a coiled state in which the length of the band instead follows a spirally curved path around a transverse coil axis lying perpendicular to the longitudinal axis $A_L$ and parallel to the width dimension $D_W$. In a known manner, the bi-stable spring band is switchable out of its linear state by performing a snapping action by which the widthwise concavity/convexity of the band is reversed. That is, with the band in its fully linear state where the longitudinal axis is purely linear over the full length thereof, depression of a convex side of the band with sufficient force will cause this initially convex side to snap into a convex curvature (thus likewise snapping the opposing initially concave side into a convex state), and causes the band to self-wind into the coiled state.

The spring band 12 imparts this same bi-stable shape characteristic to the overall securement device 10, whereby the securement device is switchable between a linear state (shown in FIGS. 1 and 2) in which the device's longitudinal axis $A_L$ follows a flat linear path over the entire length of the spring band, and a coiled state in which the device's longitudinal axis $A_L$, over the entire length of the spring band, follows a spirally curved path about the transverse coil axis. The composition, firmness and thickness of the skin are selected so that the skin provides resistance to self-winding action of the spring when snapped out of its linear state, thus retarding, but not fully stopping, the self-winding action.

The embedments 18, 18a, 18b are bonded to a face of the bi-stable spring band 12 on the side thereof that is of convex curvature in the width dimension $D_W$ when the spring band is in its linear state. The embedments are bonded to the spring band 12 by an epoxy or other flexible bonding agent that is compositionally distinct from the outer skin 14 and is capable of securely anchoring the embedments to the spring band without interfering with the transition of the spring band between its two stable states. Being bonded directly to the spring band separately of the outer skin, each embedment has a stronger attachment to the spring band than would be provided solely by the common encapsulation of both the spring band and embedments by the outer skin. The embedments are provided in a distributed fashion along the length dimension of the spring band 12, preferably at equally spaced intervals therealong. Accordingly, at each one of a plurality of discrete locations equally spaced apart from one another in the longitudinal direction, the securement device features at least one embedment. In the illustrated example, a proximal end location residing nearest the proximal end 10a of the device is occupied by a larger proximal end embedment 18a of greater size than the other embedments, a distal end location residing nearest the distal end 10b of the device is occupied by a pair of distal end embedments 18b, and a series of intermediate locations residing between the proximal and distal end locations are each occupied by a singular embedment 18, which for example may be of equal size to the two distal end embedments 18b.

In one preferred embodiment, each embedment is a magnetic embedment, for example in the form of a neodymium magnet. The larger proximal end embedment 18a and the two distal end embedments 18b thus provide greater magnetic field strength at the proximal and distal end locations than at each of the intermediate locations where the smaller size and quantity of magnets provide a lesser magnetic field strength at leach location. It will be appreciated that the use of a larger singular magnet at the proximal end location may be substituted for a plurality of smaller magnets, such as the pair of magnets 18b illustrated at the distal end location, while still achieving the result of greater magnetic strength at the proximal end location relative to the intermediate locations. Likewise, the multiple magnets at the distal end location may be substituted for a larger singular magnet while still achieving the result of greater magnetic strength at the distal end location relative to the intermediate locations. Having greater magnetic strength at the proximal end location is preferable since this point is subject to the most direct loading when the securement device 10 is coupled to another component via the socket coupler 22.

FIG. 2A illustrates an optional variation in the attachment of proximal end embedment 18a to the spring band 12 where instead of being substantially flush-mounted to the spring band in tight relation thereagainst like the other smaller embedments, a larger volume of epoxy or other bonding agent 16 is used at the proximal end embedment 18a than at the other smaller embedments to enable greater flex between the embedment 18a and the spring band 12 since this embedment is closest to the coupler 22 at which the securement device is loaded when connected to another component.

As shown in FIG. 2, an exterior surface area of the outer skin 14 at each of the discrete locations occupied by the embedments may feature an annular lip 26 raised up from surrounding regions of the skin's exterior surface to create a cup-shaped frill delimiting a recessed cavity within the confines of the lip 26 so that these frilled areas of the outer skin 14 form integrally-defined suction cups by which securement of the device 10 to smoothly surfaced objects can be improved. In embodiments employing magnetic embedments, securement of the device 10 to smoothly surfaced areas of ferromagnetic objects can thus be achieved at least partially through a combination of magnetic attraction and suction-cup action. However, in other instances, the cup-shaped frills may be omitted, for example as shown in the variant of FIG. 2B, while still using magnetic coupling to secure the device 10 to ferromagnetic objects. The embedments thus serve as securement elements by which securement of the device to one or more surfaces of an object is at least partially achieved. Even where the cup-shaped frills are omitted, the resiliently flexible material of the outer skin nonetheless improves the securement of the device 10 to the surface of an object by providing frictional resistance to shear-like sliding of the skin's outer surface area along the surface of the object in either the longitudinal or transverse direction.

To provide this frictional gripping effect, the outer skin 14 is formed at least partially of a resiliently flexible material such as latex or silicone. In addition to imparting frictional gripping functionality, the flexible outer skin also serves to protect the object to which the securement device is being secured, by preventing direct contact of the object with the embedments and spring band, which otherwise could mar the surface of the object. The outer skin may have a composite construction, for example having one or more reinforcement layers therein to prevent tearing or premature wear. In the illustrated example, a reinforcement layer 20 of mesh fabric overlies the embedments 18 and the inter-embedment areas of the spring band 12 located between the embedments 18. The fibers used in the reinforcement layer may be, for example, Kevlar fibers, aramid fibers, carbon fibers, or other synthetic or natural fibers. The outer skin 14 may optionally be coated with a dry adhesive to impart additional gripping strength between the securement device and either a surface on which the device is used in its linear state, or an object around which the securement device at least partially wraps in its coiled state.

Though the illustrated embodiment has a single-sided embedment layout featuring a set of embedments (preferably with an overlying mesh reinforcement layer) on only a first side of the spring band 12 (specifically the convex-when-linear side thereof), other embodiments may employ a double-sided embedment layout featuring an additional set of embedments, preferably with another reinforcement layer laid thereover, on a second opposite side of the spring band (i.e. the concave-when-linear side thereof). To improve the durability of the outer skin on the second side of the spring band 12, a second reinforcement layer may be included on the second side of the spring band even in instances where only a single-sided embedment layout is used. Where a double-sided embedment layout is used, the exterior surface of the outer skin 14 on the second side of the spring band may optionally feature the above-described suction-cup frills at the embedment-occupied locations of the band's second side.

In the case of a single-sided embedment layout, the embedments contribute a non-uniform thickness profile over the length of the spring band, where a thickness of the device 10 is greater at the embedment locations than at thinner areas located between the embedments in the longitudinal direction. Likewise, whether in the case of a single-sided or double-sided embedment layout, the embedments contribute a non-uniform skin depth over the length of the spring band. That is, a skin depth measured on each embedment-equipped side of the spring band from the face of the spring band to the exterior surface of the skin furthest from the spring band is greater at each embedment location that at the areas between the embedments. Accordingly, if the securement device were laid out on a flat object surface while in the linear state with an embedment-equipped side of the spring band facing said object surface, the exterior surface of the skin would contact the object surface at the embedment locations, but not at the areas between the embedment locations. To further prevent tearing or premature wear, the outer skin may have a curved topology profile 28 at each embedment-equipped side of the spring band, as schematically illustrated in FIG. 1, where the skin depth thus gradually increases in all directions toward each embedment location from the neighbouring areas between the embedments. This avoids sharp edges in the skin depth profile that could otherwise catch on other objects and cause the outer skin to rip during use of the device.

The stiffener/dampener 24 is fully encapsulated within the outer skin 14 along with the spring band 12 and embedments, and imparts a greater rigidity and strength to the device 10 at a neck portion thereof between the proximal end 12a of the spring band 12 and the socket coupler 22 through which the securement device 10 is connectable to a tripod leg other piece of compatible equipment. The stiffener/damper also imparts a degree of shock and vibration absorption between the socket coupler 22 and the spring band 12 in order to dampen impact forces and vibration from an object on which the securement device is placed, to the tripod leg or other piece of equipment to which the securement device is coupled. In the illustrated embodiment, the stiffener/dampener 24 is a small length of tubing that is split at a spring-attached end 24a thereof, and is sealed closed at an opposing coupler-attached end 24b thereof. At the spring-attached end 24a, the split halves of the tubing are respectively bonded to the two sides of the spring band 12 in a fluid-tight manner. Between this fluid-tight bonding of the split end of the tubing to the spring band, and the fluid-tight closure at the opposing coupler-attached end, the tubing defines a hollow member whose interior space 30 is fluidly isolated from the outer skin 14 that surrounds the stiffener/dampener. This interior space 30 of the stiffener/dampener 24 is filled with a flowable substance, which may be of gaseous, liquid, gelled or granular-solid composition. The tubular wall of the stiffener/dampener 24 has greater rigidity than the resiliently flexible skin material, while still being flexible, thereby imparting a stiffening function to this neck portion of the device in order to limit the allowable degree of angular deviation between the coupler 22 and the proximal end of the spring band 12. Meanwhile, the use of a flowable filler in the interior space 30 of the stiffener/absorber serves as a shock absorber or vibration dampener to help minimize transfer of shock or vibrational loads to the socket coupler 22 from an object to which the skin-covered spring band 12 is secured (for example by the magnetic embedments and optional suction cup frills).

The socket coupler 22 is co-operable with a mating ball coupler provided on the compatible tripod leg or other piece of equipment to accomplish a snap-fit ball and socket joint therewith. The socket coupler 22 thus has a spherically concave interior receiving socket 32 that is of greater than hemispherical size, and has an open outer end at the proximal end 10a of the securement device to accommodate insertion of the ball tip of the mating ball coupler. In a default unflexed state of the socket coupler 22, the diameter of the receiving socket 32 at the open outer end thereof is slightly lesser than the outer diameter of the ball tip of the mating ball coupler, but will resiliently flex into an enlarged state during forced insertion of the ball tip into the socket, before automatically returning back to its default size of lesser diameter than the ball tip, thereby retaining the ball tip within the socket in a snap-fit relation therewith. This snap fit frictionally resists subsequent withdrawal of the ball tip from the receiving socket. The socket coupler is preferably a split or slotted socket coupler, where the spherically contoured wall of the socket is split into multiple leaves (e.g. three-leaves) to reduce the potential for stress failure of the socket wall over time due to repeated flexing of the socket each time its mated with and detached from a cooperative ball coupler.

FIG. 3 illustrates a tripod assembly 100 featuring a set of three tripod legs 102 and a cooperating tripod yoke 104 by which the legs are connectable together. A lower or distal foot end of each tripod leg 102 features a ball coupler 106 selectively matable with the socket coupler 22 of the securement device 10 of the type described above in relation to FIGS. 1 and 2, whereby a set of three securement devices 10 can serve as attachable/detachable tripod securement feet to support the tripod on various surfaces and objects. Through rotational movement allowed in three dimensions between ball tip of each ball coupler 106 and the receiving socket 32 of the mating socket coupler 22, and through the limited angular flex allowed between the socket coupler 22 and the proximal end of the securement device's spring band 12, the relative angle of the securement device 10 to the tripod leg 102 can be varied in three dimensions to best suit the particular surface(s) on which the tripod is to be supported. The snug snap-fit relation between the ball and socket couplers will serve to maintain the selected orientation absent the application a sufficient external adjustment force to overcome this frictional fit between the couplers.

With magnetic embedments, one or more of the securement devices can be used in their flattened linear state with the embedment-equipped side thereof placed against relatively flat surfaces of one or more ferromagnetic objects, where the magnetic embedments, the frictional sliding resistance of the outer skin 14 and the optional suction cup frills and/or dry adhesive (if included) cooperatively secure the securement devices in stable anchored positions on the ferromagnetic object(s). Exemplary uses of this type include mounting of cameras to vehicles, for example on door, hood, roof or body panel surfaces thereof. One or more of the securement devices can also be used in their coiled state to secure their respective tripod legs to one or more objects (hand rails, lamp posts, etc.) in a wrap-around fashion where the securement devices coil fully or partially around such objects. In the event that the object is ferromagnetic, the optional use of magnetic embedments enhances the securement strength to the object by supplementing the coiled frictional contact of the securement device's outer skin with the object it is wrapping around. The securement device can also conform to more complex surface geometries by having part of the device's length disposed in the linear state to conform against a relatively flat surface, and another part of the device's length disposed in the coiled state to conform against a neighbouring or adjoining curved surface, or to transition between two differently oriented surfaces.

Figure 4:
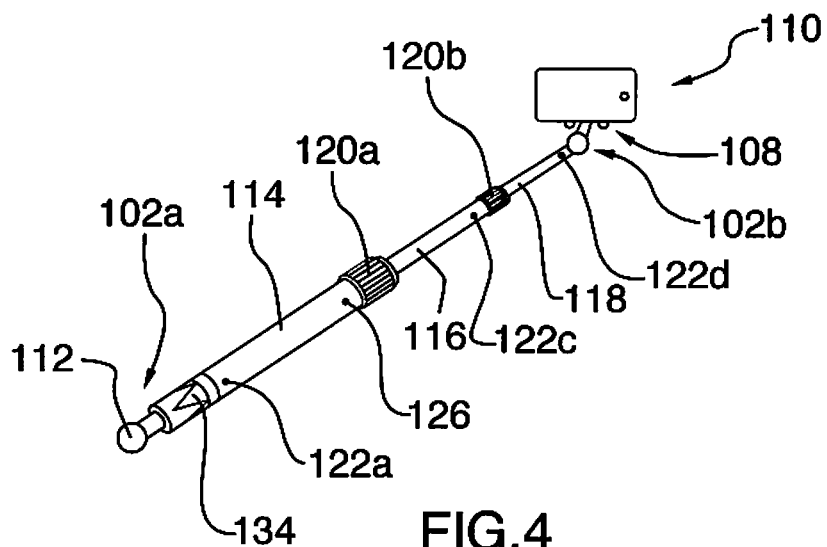
FIG. 4 illustrates one of the legs of the FIG. 3 tripod in isolation after detachment thereof for use as a selfie-stick.

The same ball coupler 106 at the distal/lower foot end of each tripod leg 102 can also be used to enable removable attachment of other components or accessories that are equipped with a matable socket coupler 22 of the type described above. FIG. 4 shows one of the tripod legs 102 from FIG. 3 in a detached and isolated state from the tripod yoke 104 and other tripod legs, and illustrates use of the isolated tripod leg 102 as a selfie-stick. In this example, a smartphone holder 108 features a socket coupler 22 of compatible size to the ball coupler 106 of the tripod-leg/selfie-stick 102 to enable removable mounting of a smartphone 110 to the distal end of the tripod-leg/selfie-stick 102 in a manner enabling angular adjustment of the smartphone orientation relative to the tripod-leg/selfie-stick 102 in three dimensions via the ball and socket joint formed by the socket coupler and the mated ball tip of the ball coupler.

As revealed by FIG. 4, each tripod leg 102 also features a second ball coupler 112 at a proximal yoke end thereof opposite the distal/foot end. It is via this second ball coupler 112 that each tripod leg 102 is removably attachable to the tripod yoke 104 via a compatibly sized socket coupler carried thereon. The second ball coupler 112 of each tripod leg is larger than the first ball coupler 106 in the illustrated embodiment, and so the socket couplers of the yoke 104 are likewise larger than the socket coupler 22 of each securement device. Accordingly, each tripod leg is connectable to the yoke only at the leg's proximal end, and not at the opposing distal end due to the incompatibility of the smaller ball coupler 106 with the yoke sockets.

FIG. 4 also illustrates a telescopic structure of each tripod leg 102, which in the illustrated example features three telescopically mated leg sections 114, 116, 118 of larger to smaller cross-sectional size moving from the proximal yoke end 102a to the distal foot end 102b thereof. It will be appreciated that the number of telescopically mated leg sections may be varied from the particular three-section configuration shown in the illustrated embodiment. In a conventional manner, each pair of mating telescopic sections are selectively lockable at a selected degree of collapse/extension by a rotatable locking collar 120a, 120b.

The proximal leg section 114 defining the proximal end of the tripod leg features a pair of connection ports 122a, 122b thereon, each near a respective end of the proximal leg section 114. The intermediate leg section 116 is selectively extendable and retractable relative to the proximal leg section 114, and features another threaded connection port 122c thereon near the distal end of the intermediate leg section through which the final distal leg section 118 is extendable and retractable. This distal leg section 118 likewise features another threaded connection port 122d thereon near the distal end 102b of the leg. Each threaded connection port is of a standardized thread type commonly used in the field of camera-related equipment, preferably ¼-20 thread (¼-inch major diameter, 20 threads per inch).

Figure 4A:
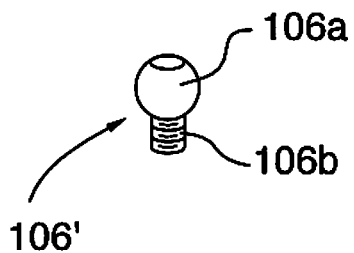
FIG. 4A illustrates a selectively attachable ball coupler mountable to the tripod legs of FIG. 3 at threaded connection ports thereon.

FIG. 4A shows a selectively attachable ball coupler 106' having a ball-tip 106a of matching diameter to that of the distal end ball coupler 106 on each tripod leg, and having a threaded base portion 106b in the form of an externally threaded stem projecting axially from the ball tip. The threaded base portion 106b is of matching thread type to the connection ports 122a, 122b, 122c, 122d of each tripod leg 102. Accordingly, each attachable ball coupler 106' is selectively attachable to any of the available connection ports on any tripod leg to enable selective attachment thereto of any accessory component having a compatibly sized socket coupler thereon that is matable with the ball tip 106a of the ball coupler 106'. So referring to the FIG. 4, where one of the tripod legs is being used as a selfie-stick, when use of the assembled tripod is again desired, the smartphone holder 108 can be removed from the distal end ball coupler 106 of the leg, and then mated with an attachable ball coupler 106' mounted the side of the leg 102 at any one of the available threaded connection ports. This way, the smartphone holder can be safely stored on the tripod, thus preventing loss or misplacement of the smartphone holder when not in use. Likewise, any other accessory with a socket coupler of compatible size with the attachable ball couplers 106' can be safely stored on any of the tripod legs.

Similarly, any of the securement devices 10 can be stowed on the side of any of the tripod legs via the threaded connection ports and attachable ball mounts 106' when the securement device is not in use as a tripod foot at a distal end of one of said legs. For example, tripod spikes equipped with socket couplers of compatible size with the distal end ball couplers of the tripod legs may be selectively attachable to the distal ends of one or more of the tripod legs for situations where the bi-stable securement devices 10 are not suitable, and where surface penetrating spikes would be more effective. During use of the spikes, the bi-stable securement feet 10 can be stored on the sides of the tripod legs 102 via the connection ports and attachable ball couplers 106'. In other instances, the tripod spikes may be stored on the sides of the tripod legs during use of the hi-stable securement feet. The two threaded connection ports 122a, 122b on the proximal section 114 of a telescopic leg would typically be used for such storage purposes, since they are exposed and accessible at all times, regardless of the current degree of leg extension or collapse, unlike the connection ports 122c, 122d on the intermediate and distal leg sections 116, 188, which are hidden when the telescopic tripod leg is fully collapsed.

While the proximal leg section 114 may feature only a single threaded connection port instead of the two connection ports 122a, 122b of the illustrated example, the inclusion of multiple connection ports has additional benefits beyond the available quantity of mounting sites at which socket-equipped components and accessories can be selectively mounted. Particularly, multi-socketed components or accessories having two socket couplers thereon at equivalently spaced positions to the two threaded connections ports of the proximal leg section can be mounted thereto in a fixed orientation in which the mating of each socket coupler of the multi-socket component or accessory with a respective one of two attachable ball couplers 106' on the proximal leg section blocks rotation of the multi-socketed component or accessory about the ball tip of the other attachable ball coupler.

Figure 4B:
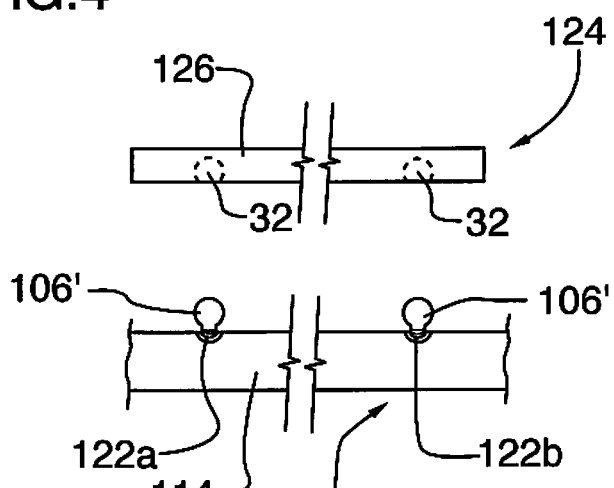
FIG. 4B illustrates use of two selectively attachable ball couplers installed at two threaded connection ports of one of the tripod legs to enable oriented mounting of an accessory thereon.

This is schematically shown in FIG. 4B, where a multi-socketed accessory 124 features an elongated base 126 whose length exceeds the distance between the two threaded connection ports 122a, 122b on the proximal section 114 of each tripod leg 102. The base features two sockets 32 of cooperative snap-fit compatibility with the two attachable ball couplers 106' respectively engaged in the two threaded connection ports 122a, 122b of the tripod leg's proximal section 114. The center-to-center spacing of the two sockets 32 matches that of the two threaded connection ports 122a, 122b and the two attachable ball couplers 106' received therein. This way, the accessory 124 can be snap-mounted onto the tripod leg in an orientation aligning the longitudinal direction of the accessory's elongated base 126 with the telescopically adjustable longitudinal direction of the tripod leg. The accessory 124 may, for example, be a lighting accessory, battery pack or any other photography/videography related accessory. The accessory 124 may be an adapter whose base carries the sockets 32 of compatible type to the ball couplers 106', and also carries one or more third-party compatible connectors thereon by which one or more third party products can be attached to the base 126 to render said third-party product(s) compatible with the inventive tripod leg for storage of the product(s) thereon.

Figure 4C:
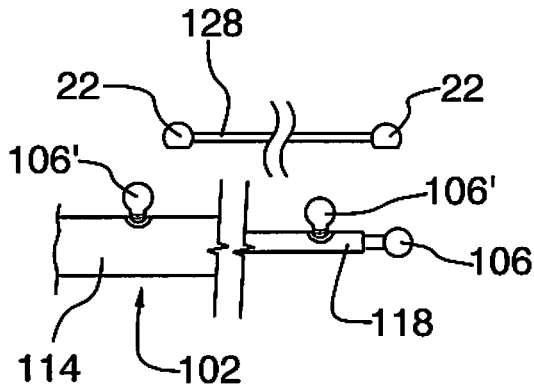
FIG. 4C illustrates use of two selectively attachable ball couplers installed at two threaded connection ports on different sections of a telescopically adjustable tripod leg to connect a bungee cord to the leg in a manner imparting a self-collapsing function thereto.

The threaded connection ports 122c, 122d on the intermediate and distal leg sections 116, 118 are co-operable with the threaded connection points 122a, 122b on the proximal leg section 114 to serve another purpose, namely to enable attachment of a bungee cord or other constrictive device from the proximal leg section 114 to either of the other leg sections 116, 118 to provide the telescopic tripod leg with a self-collapsing function causing said other leg sections 116, 118 to self-retract into the proximal leg section 114. This is illustrated in FIG. 4C, where a bungee cord 128 carries at each end thereof a respective socket coupler 22 compatible with the selectively attachable ball couplers 106' of the tripod leg 102. One of the bungee cord's socket couplers 22 is mated with an attachable ball coupler received in one of the connection ports 122a, 122b of the proximal leg section 114, and the bungee cord is stretched in order to mate its other socket coupler 22 with an attachable ball coupler received in the threaded connection port 122d of the distal leg section 118. The self-constricting action of the stretched bungee cord pulls the distal leg section 118 back toward the proximal leg section 114, thus imparting a self-collapsing action on the tripod leg 102. One example of where this is useful would be an instance where a tripod is placed atop a table, and instead of relying on feet to frictionally grip the top of the table for stability, suitable feet capable of hooking around a peripheral edge of the table are used, and self-collapsing of the tripod legs forces the feet tight against the table edge to increase the stabilization force.

Figure 4D:
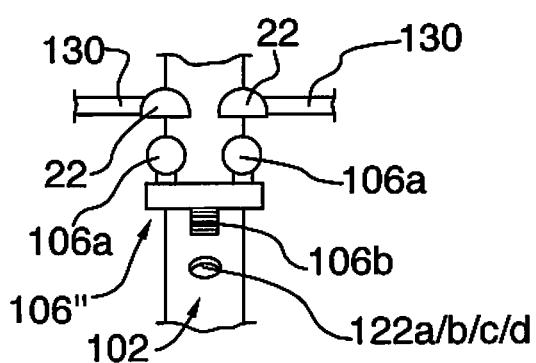
FIG. 4D illustrates use of a selectively attachable dual-ball coupler to the threaded connection port of one of the tripod legs to enable connection of a pair of stabilizing braces thereto.

Another exemplary use for the threaded connection ports and compatible ball couplers is illustrated in FIG. 4D, wherein instead of a selectively attachable single-ball coupler 106', a selectively attachable dual-ball coupler 106" features two ball tips 106a carried on a common threaded base 106b. Under connection of the common threaded base 106b to a selected connection port 122a-122d, each ball tip 106a is carried in offset relation from the connection port to a respective side of the tripod leg 102. One of these dual-ball couplers 106" is installed on each of the three tripod legs 102 at a matching one of the threaded connection ports. These dual-ball couplers are accompanied by three stabilization braces 130 that each have a pair of socket couplers 22 respectively disposed at its two opposing ends. The three braces 130 are connected around the tripod so as to each span from one ball of dual-ball coupler on one leg to the nearest ball of the dual-ball coupler on the next leg. The three braces and three dual-ball couplers thus form a closed stabilization ring spanning fully around the tripod from one leg to the next. This serves to fix each adjacent pair of tripod legs at a pre-set distance from one another dictated by the length of the stabilization brace, thus preventing relative tilting between the tripod legs and thereby improving the stability of the tripod.

While the illustrated embodiment features threaded connection ports and selectively attachable ball couplers with compatible threading, the described on-leg storage and leg brace stabilization would also be operable in other embodiments where the ball couplers 106' on the side of the leg 102 are permanently attached components, rather than removably threaded attachments. However, the use of threaded connection ports allows directly threaded coupling of third-party components already having the standardized thread type thereon without having to use an adapter of the aforementioned type.

Turning back to the tripod of FIG. 3, the yoke 104 features a hub from which three connection stubs 132 angle downwardly for respective connection to the three tripod legs 102 via the larger ball couplers 112 thereon. Each connection stub 132 thus carries a socket coupler of compatible size to accomplish snap-fit relation with the proximal end ball coupler 112 the tripod leg to form a ball and socket joint therewith in the same manner described above in relation to the securement devices 10 and the distal end ball couplers 106 of the tripod legs 102. However, an additional stabilizing mechanism is included in the FIG. 3 tripod to allow the user to selectively lock each tripod leg 102 in co-axial alignment with the respective connection stub 132 to prevent relative tilting therebetween at the mated ball and socket joint. Each connection stub 132 may be pivotally pinned to the hub of the yoke to allow angular adjustment therebetween about a singular pivot axis, and may include a detent mechanism by which the connection stub can be selectively locked at one of a plurality of predetermined angles about said pivot axis. In such embodiments, a first degree of single-axis angular adjustment is attainable between the hub and each connection stub, and a second degree of multi-axis angular adjustment in three dimensions is attainable via the ball and socket joint between the connection stub and respective tripod leg 102.

In the FIG. 3 embodiment, the stabilization mechanism features external splines 134 on the proximal section 114 of the tripod leg 102 near the proximal end 102a thereof at an axial distance inward from the ball tip of the proximal end ball coupler 112. The stabilization mechanism further includes an externally threaded ring 138 rotatably disposed around the proximal section 114 of the tripod leg 102 on the side of the splined area opposite the ball tip of the proximal end ball coupler 112, and a sliding stabilization sleeve 136 externally disposed around the connection stub 132 and axially slidable therealong. The externally threaded ring 138 is blocked from sliding axially over the splines 134 toward the proximal end of the leg. The sliding stabilization sleeve 136 is internally threaded at a lower end thereof in order to mate with the externally threaded ring 138 on the tripod leg. Above the internally threaded lower end, the stabilization sleeve 136 features an internally splined area whose spline pattern is matable with the external splines on the leg 102 in co-meshing relation therewith.

The external splines 134 on the leg 102 taper upwardly, and the internal splines on the stabilization sleeve 136 taper downwardly at a matching taper angle so that the downwardly tapered splines on the sleeve mesh into gradually tightening relation with the upwardly tapering splines on the leg when the sleeve is lowered from an initial retracted position into an extended stabilizing position reaching downwardly past the mated-together ball and socket of the leg 102 and connection stub 132. The sleeve 136 is then secured in this extended position by rotatably engaging the externally threaded ring 138 with the internally threaded lower end of the stabilization sleeve. The meshed together splines block relative rotation and tilting between the tripod legs 102 and the connection stubs 132 of the tripod yoke 104. In a variant of this mechanism, the external threading on the leg 102 may be fixed statically thereon, rather than carried on a rotatable ring, in which case the internal splines inside the sleeve would be formed on a rotatable insert inside the sleeve rather than being fixed on the internal walls of the sleeve itself so that the sleeve would be rotatable around the splined insert in order to engage the sleeve with the static threads on the leg.

Figure 5:
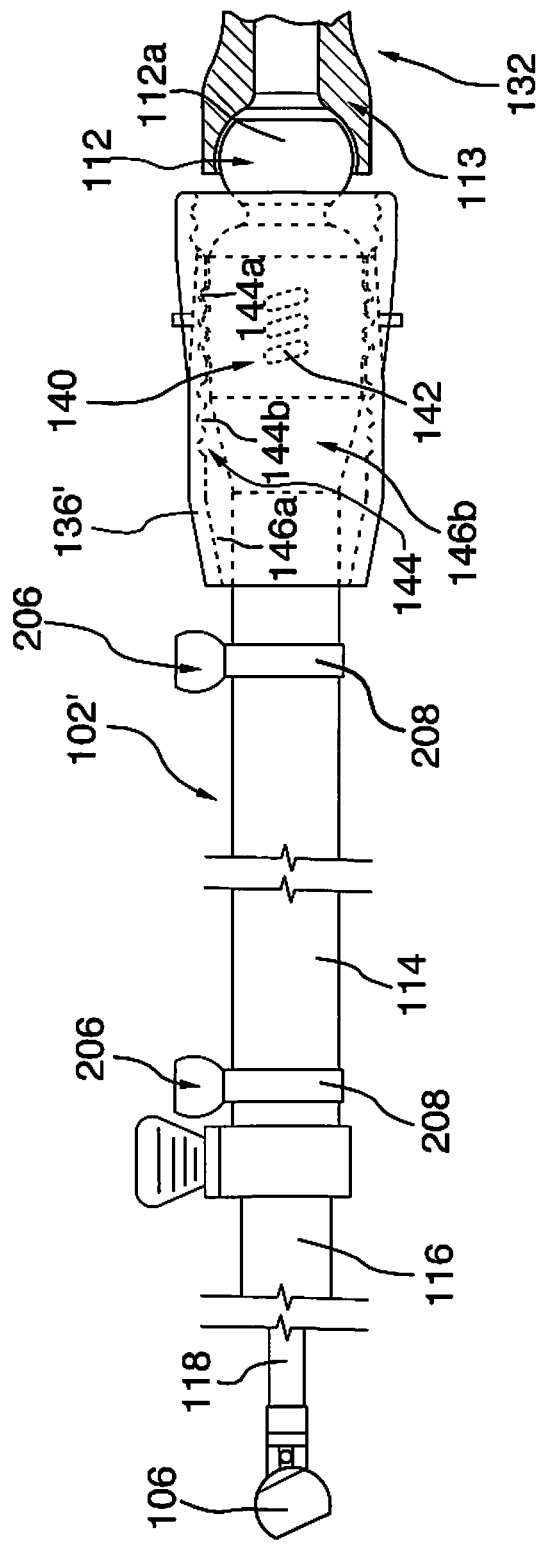
FIG. 5 shows an alternate embodiment tripod leg, and illustrates assembly of a stabilized ball and socket connection between the tripod leg and a mating tripod yoke or other component.

FIG. 5 illustrates an alternate embodiment of the tripod leg and stabilization mechanism of FIG. 3. In this embodiment, the tripod leg 102' is once again of telescopic construction featuring a proximal section 114, intermediate section 116 and distal section 118. The distal section 118 once again carries a distal end ball coupler 106 compatible with the socket couplers 22 of the securement devices 10 and any other optional spike or foot components. Instead of selectively attachable ball couplers 106' matable with threaded connection ports, the leg 102' of the present embodiment uses movably supported ball couplers 206 that are movable into different positions on the leg. The proximal leg portion 114 of the illustrated leg 102' features two such movable ball couplers 206, each carried on a movable support ring 208 that is circumferentially rotatable around, and/or axially displaceable along, the proximal leg portion 114 to adjust the circumferential position or axial location of the movable couplers 206 around or along the proximal section 114 of the tripod leg 102'. Ball detent mechanisms may be used to hold the support rings at selected positions. Each support ring 208 may feature, for example, four detents at equally spaced intervals therearound, whereby the ball detent mechanism of each support ring 208 is operable to hold the ball coupler 206 in any one of four circumferentially spaced positions spaced at ninety-degree intervals around the longitudinal axis of the leg so that the ball coupler 206 can be selectively placed on any of the leg's four different sides. Multiple spring-loaded balls may be provided at axially spaced intervals along the leg to allow selective sliding of the support rings from one ball-equipped location thereon to another, where the spring-loaded ball of the leg then engages with one of the detents in the ring 208.

In the FIG. 5 embodiment, the stabilization mechanism for preventing relative tilting between the tripod leg 102' and the respective yoke connection stub 132 (or other component to which the leg is to be coupled) once again features a stabilization sleeve 136'. In this embodiment, the sleeve 136' is mounted on the tripod leg 102', not on the yoke's connection stub, and the intermeshing splines and rotatable threaded ring of the earlier embodiment are omitted. In the present embodiment, the proximal end ball coupler 112 of the tripod leg 102' has a body portion 140 of greater diameter than the ball tip 112a that projects axially from the body portion 140, and this body portion 140 has raised external threads 142 carried statically thereon that are co-operable with internal threads 144 on the stabilization sleeve 136. However, the threading 142 on the ball coupler body 140 does not span fully therearound, and instead is provided only at discretely spaced areas around the circumference of the ball coupler body 140. Likewise, the internal threads of the sleeve 136' only occupy discrete areas of the sleeve's internal wall. The sleeve's threaded areas however are circumferentially spaced apart by an angular interval twice that of the angular interval between the threaded areas of the ball coupler body 140. Between the threaded areas, the sleeve interior has smooth walled areas where the internal sleeve diameter exceeds the major diameter of the external threads 142 on the ball coupler body 140.

In the illustrated example, the threaded areas on the ball coupler body are spaced apart at ninety-degree intervals to reside on all four sides of the ball coupler body, while the threaded areas on the sleeve are spaced apart at 180-degree intervals to reside on only two diametrically opposing sides of the sleeve interior. Rotation of the sleeve through a predetermined angular displacement of equal measure to the thread spacing interval of the ball coupler body (i.e. a 90-degree quarter turn, in the aforementioned example) is thus operable to switch the sleeve between a free-sliding state in which the threaded areas of the sleeve and ball coupler body are disengaged from one another, and a thread-engaged state in which the threaded areas of the sleeve and ball coupler body are engaged with one another. In the free-sliding state, the threaded areas of the ball coupler body 140 underlie the smooth-walled areas of the sleeve interior so that the sleeve 136' can slide freely along the ball coupler body in the axial direction.

The figure shows the stabilization sleeve 136' in a retracted position in which a majority of the ball tip 112a of the proximal end ball coupler 112 is uncovered by the sleeve 136', and in the thread-engaged state with a proximal set 144a of the internal sleeve threads engaged with the external threads 142 of the ball coupler body 140. Once the ball tip 112a of the ball coupler is matingly inserted into snap relation inside the compatible socket coupling 113 of the tripod yoke connector 132 or other component, rotation of the sleeve through the predetermined angular displacement (e.g. quarter turn) is performed to place the sleeve in its free-sliding state, and the sleeve is slid axially into an extended position in which the sleeve 136' now encompasses not only the threaded body portion 140 of the ball coupler, but also the socket of the other component's socket coupler 113 in which the ball tip 112a is matingly received. At this point, the sleeve is again rotated through the predetermined angular displacement (e.g. quarter turn), which now serves to engage a distal set 144b of the internal sleeve threads onto the external threads 142 of the ball coupler body. During this engagement of the threads, the thread direction serves to further advance the sleeve in the axial direction into a fully its fully extended position around the mated-together ball and socket. Extension beyond this fully extended position is prevented by cooperation of an internally tapered distal end 146a of the sleeve 136' and externally tapered distal end 146b of the ball coupler body 140 situated opposite the ball tip 112a thereof.

The concentric relationship of the fully extended sleeve 136' in close fitting circumferential relationship around the socket coupler 113 constrains relative angular movement between the two couplers in any direction, thereby maintaining the tripod leg 102 and tripod yoke connector 132 or other component in concentric alignment with one another to prevent tilting therebetween, and thus stabilizing the ball and socket joint in this aligned condition of the components. The socket coupler 113 may include external threads thereon at matching intervals to the ball coupler body threads 142 for engagement of such external socket coupler threads by the proximal thread set 144a of the sleeve when tightened into the fully extended state by engagement of the distal thread set 144b of the sleeve on the ball coupler body threads 142. Release of this stabilized state of the ball and socket join to enable angular adjustment or decoupling thereof is performed by rotating the sleeve through the predetermined angular displacement (e.g. quarter turn) in an opposite direction to disengage the distal thread set 144b on the sleeve from the external threads 142 of the coupler body 140 (and likewise disengaging the proximal thread set 144a from the socket coupler threads, if provided). Now in the free-sliding state, the sleeve 136' is slid axially in a retracting direction away from the ball and socket joint, and preferably then turned again through the predetermined angular displacement to engage the proximal thread set 144a of the sleeve with the external threads 142 of the ball coupler body 140 to hold the sleeve in the retracted position, as show in the figure.

The stabilization mechanisms described herein may similarly be used on ball and socket equipped components other than tripod legs and tripod yokes to similarly allow selective locking of the components in aligned relation to one another by extending the sleeve into a stabilizing position around both of the mated couplers, while also allowing angular variation between the components via the assembled ball and socket joint if the stabilization sleeve is left in the retracted position withdrawn from around the mated-together couplers.

The ball and socket couplers described above make use of the snap fit relationship between the ball tip and receiving socket to frictionally resist withdrawal of the ball coupler from the socket coupler. Some embodiments of the present invention further include a secondary retention mechanism adding supplementary mechanical resistance to such separation of the couplers from one another.

One example of such a mechanism is schematically illustrated in FIG. 7, which shows a socket coupler 22 of the type usable in the securement devices 10 of the preceding embodiments, and a mating ball coupler 106 of the type useable on the distal end of a tripod leg 102 to allow attachment of the securement device 10 thereto. However, it will be appreciated that the same mechanism may be employed at the ball and socket joint between a tripod leg and tripod yoke, in the ball and socket joint between the attachable couplers 106' and compatibles accessories, or in any other snap fit ball and socket joint used in various applications.

The ball coupler 106 has a male insertion member 150 attached thereto in the form of an elongated shaft element 152 protruding axially from the ball tip 106a of the coupler 106 on a central axis $A_1$ thereof, and a pair of spherically ball-shaped enlargements 154a, 154b affixed to the shaft element 152 at axially spaced positions thereon. The socket coupler 22 has a female receiver space 156 defined internally thereof behind the receiver socket 32, and accessible from the socket via an opening 158 that penetrates the socket wall on a central axis $A_2$ of the socket coupler. This central axis $A_2$ intersects the socket wall at central point thereon that denotes the deepest point or apex of the socket's concavely spherical curvature. The diameter of each enlargement 154a, 154b exceeds the diameter of the elongated shaft element 152, but is lesser than the diameter of the opening 158 to the female receiver space 156.

Respectively located on the central axes $A_1$, $A_2$ of the two couplers, the male insertion member 150 and the opening 158 of the female receiver space 156 align with one another under forced insertion of the ball tip 106a of the ball coupler 106 into the receiving socket 32 of the socket coupler 22. The male insertion member 150 is long enough to penetrate through the opening 158 into the female receiver space 156 during this mating of the ball and socket joint. The distance from the ball tip 106a to the first enlargement 154a nearest thereto exceeds the distance from the ball tip's fully inserted position in the socket 32 to the central opening 158 in the socket wall, whereby both enlargements 154a, 154b are received in the female receiver space 156 when the ball tip 106a has been fully inserted into its snap fit relation inside the receiving socket 32. Behind the opening 158 in the socket wall just inside the female receiver space 156 are a set of three latching members 160 that are pivotable about respective pivot axes 161 that lie in a common plane normal to the central axis $A_1$, of the socket coupler 22 at outer ends of the latching members adjacent the interior wall of the receiver space 156. The latching members 160 are spring biased about the pivot axes 161 toward closed positions abutting one another near the central axis $A_1$ and cooperatively obstructing a substantial majority of the opening 158.

Figure 7A:
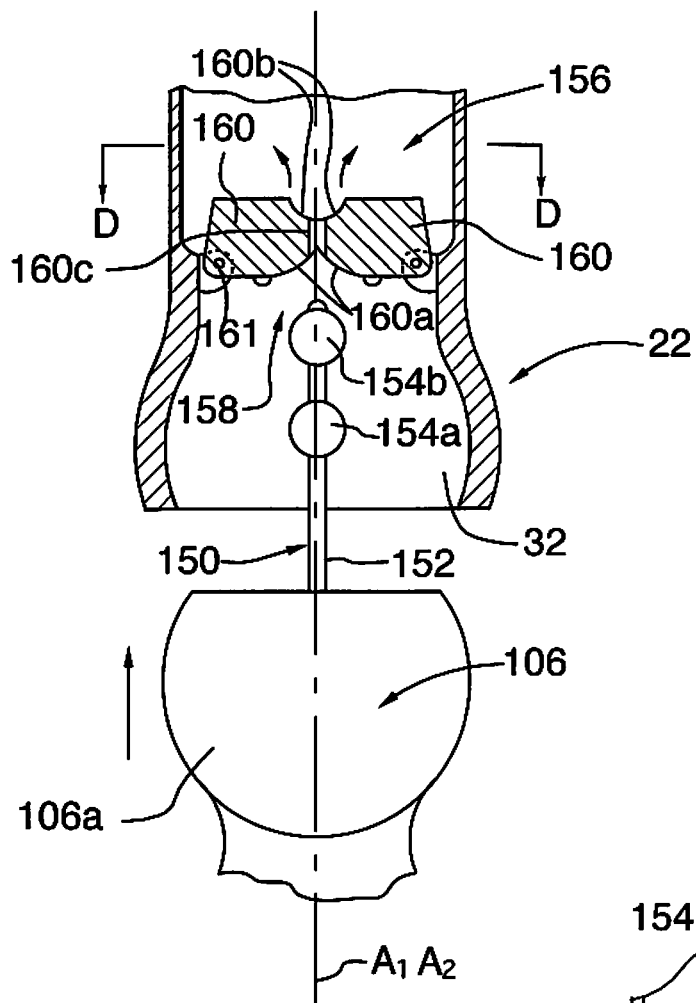
FIG. 7A is a cross-sectional view, as viewed along line A-A of FIG. 7D, of matable ball and socket couplers having cooperating components of a secondary retention mechanism that supplements the frictional resistance of a snap fit relation between the couplers to better prevent inadvertent separation thereof under notable loading conditions.

The latching members 160 are shaped with camming surfaces 160a on the sides thereof that face into the socket 32 in order to pivot the latching members outwardly away from one another into open positions reaching further into the female receiver space 156 when each enlargement 154a, 154b is forced through the opening 158 into contact with these camming surfaces 160a during insertion of the ball coupler tip 106a to the socket 32. Such opening of the latching members during insertion of the ball coupler is shown in FIG. 7A. In the open positions of the latching members, the inner ends thereof are spaced far enough apart to accommodate passage of the enlargements 154a, 154b past the latching members into the receiver space 156.

Figure 7B:
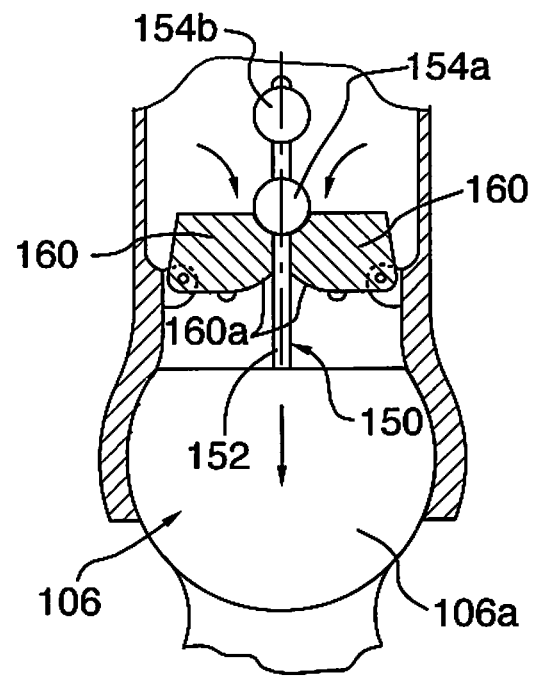
FIG. 7B shows the same couplers as FIG. 7A, but in a snap fit assembled state with the secondary retention mechanism engaged.
Figure 7C:
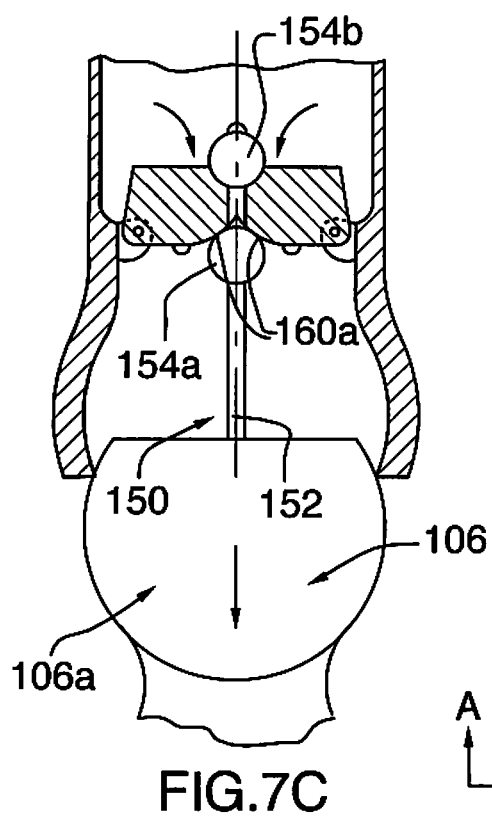
FIG. 7C shows the same couplers of FIG. 7B, illustrating a failsafe operational mode of the secondary retention mechanism after failure of the snap fit.

The latching members 160 also have concave recesses 160b at the opposite sides thereof that face away from the socket further into the female receiver space, and these recesses 160b cooperatively form a spherical seat that is situated on the central axis $A_1$ and is sized to conformingly receive either of the enlargements 154a, 154b therein, as show in FIGS. 7B and 7C. Attempted withdrawal of either enlargement 154a, 154b from the female receiver space, absent the activation of a separate release mechanism described below, acts only to further encourage the latching members into the closed positions obstructing the opening 158, thus blocking such withdrawal of the male insertion member 150 from the female receiver space 156, as shown in FIG. 7B. The inner ends of the latching members are concavely curved about the central axis A1 in order to collectively define a through-bore 160c of sufficient diameter to accommodate the shaft element 152 of the male insertion member 150 in the closed positions of the latching members.

Figure 7D:
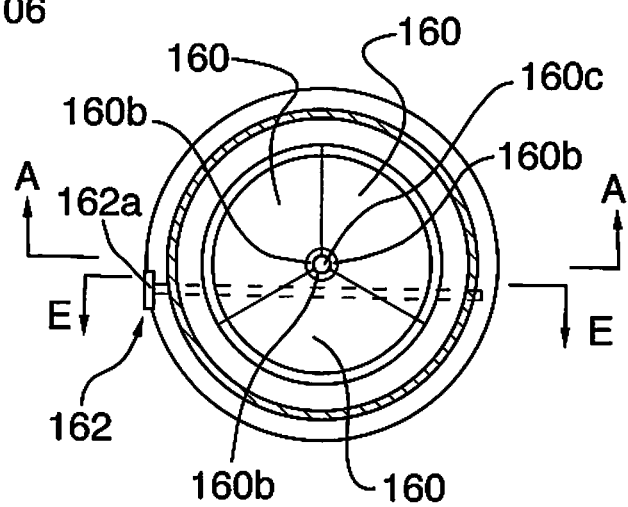
FIG. 7D is a cross-sectional view of the ball and socket couplers of FIG. 7A as viewed along line D-D thereof.

The release mechanism comprises a release actuator 162 selectively operable by a user to once again pivot the latching members 160 away from one another into the open positions enabling withdrawal of the enlargements 154a, 154b past the latching members 160 and through the opening 158. In the illustrated example, the release actuator is a push button release plunger 162 that penetrates the wall of the socket coupler 22 at the opening 158 of the female receiver space 156 and spans across the opening 158 on a non-diametrical chord line thereof, i.e. in perpendicular relation to the central axis $A_1$ at a position offset to one side thereof. With reference to FIG. 7D, this non-diametrical chord line of the plunger 162 underlies all three of the latching members.

Figure 7E:
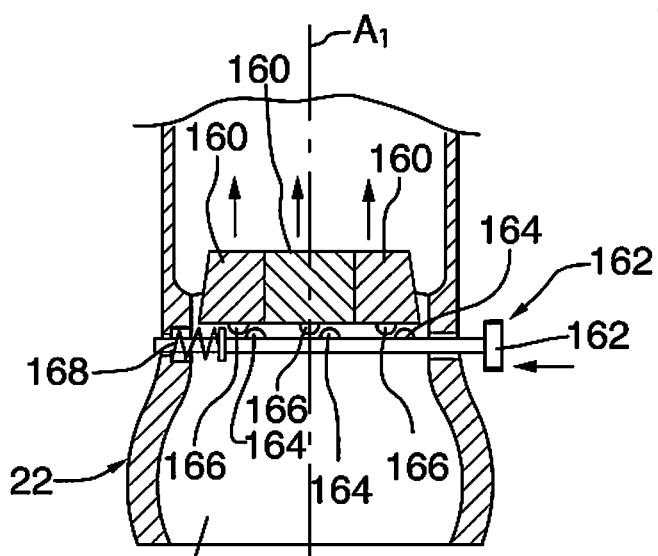
FIG. 7E is a cross-sectional view of the ball and socket couplers of FIG. 7D as viewed along line E-E thereof, showing a release mechanism by which the secondary retention mechanism can be disengaged to enable separation of the couplers.

With reference to FIG. 7E, the plunger 162 features three raised points 164 thereon that point toward the latching members 160 and correspond to the corresponding protrusions 166 on the socket-facing sides of the latching members. In a normal position of the release plunger, shown in FIG. 7E and maintained by a biasing spring 168 operating between the plunger and the interior wall of the socket member, for example at a location opposite where the plunger penetrates the interior wall of the socket member, the raised points 164 of the plunger do not align with the protrusions 166 on the latching members 160. However, when a head 162a of the plunger situated outside the socket member 22 is depressed in a direction opposing the action of the biasing spring 168, the plunger is displaced into a release position pushing the raised points 164 into camming contact with the protrusions 166, which forces the latching members 160 into their open positions, thus allowing withdrawal of the insertion member's enlargements 154a, 154b from the receiving space 156.

At least a portion of the elongated shaft element 152 between the ball tip 106a and the first enlargement 154a nearest thereto is flexible in order to allow the relative rotation between the mated together ball tip 106 and socket 32 in directions causing the central axes $A_1$, $A_2$ of the couplers tilt out of alignment when sufficient force is applied to overcome the frictional resistance provided between the closely conforming spherical surfaces of the couplers. This flexibility in the male insertion member 150 thus retains the angular-adjustment functionality provided by the mated ball and socket couplers, provided that one of the forgoing stabilization mechanisms or another external constraint is not in place to prevent such relative tilting movement between the couplers.

The first enlargement 154a, whose extraction from the female receiver space is normally blocked by the latching members 160, acts as a first supplementary retention feature to mechanically augment the snap fitted relation of the couplers that frictionally resists separation thereof. This is shown in FIG. 7B, where attempted pulling of the ball coupler 106 out of the socket 32 is resisted by both the snap fit relationship between the ball tip 106a and surrounding socket 32, and the latched condition of the latching members 160 around the shaft element 152 of the male insertion member 150, whose first enlargement is seated against the seat of the closed latching members 160. Even in the event of a snap fit failure combined with a momentary inadvertent depression of the release plunger by which first enlargement 154a is allowed to escape the female receiver space, the second enlargement 154b provides a second failsafe retention feature blocked from inadvertent withdrawal by the normally closed positions of the spring biased latching members. This is shown in FIG. 7C, where despite escape of the ball tip from the socket, fully separation of the couplers is prevented by latching of the male insertion member at the second enlargement 154b thereof.

While FIG. 7 shows the male insertion member 150 of the secondary retention mechanism as being provided on the ball coupler 106, with the female receiving space 156 and latching and release mechanisms being provided on the socket coupler 22, it will be appreciated that this configuration may be reversed, provided that the latching and release mechanisms are appropriately positioned so that the external part 162a of the release actuator 162 is axially far enough from the tip 106a of the ball coupler in order to reside outside the socket coupler 22 in accessible fashion to the user when the ball and socket are mated together.

Figure 6:
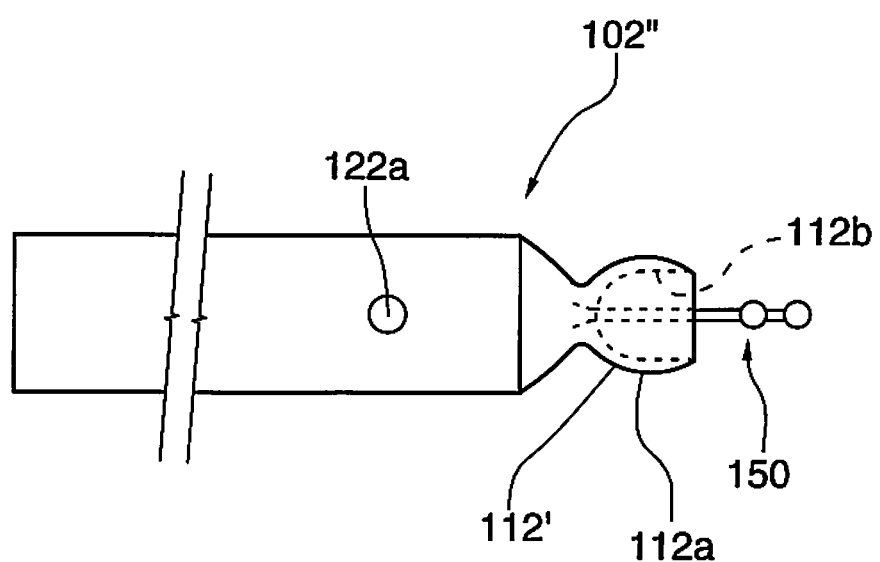
FIG. 6 shows a simplified embodiment of the tripod leg that lacks a stabilizer for the ball and socket connection to the mating tripod yoke or other component.

FIG. 6 illustrates a simplified form of the tripod leg of the earlier embodiments that omits the stabilization mechanisms thereof and relies solely on the frictional fit between the ball and socket couplers of the tripod leg and tripod yoke to maintain a user-selected tilt angle between the leg and the yoke connector, or on a combination of this frictional fit together with the optional connection of the stabilization braces 130 between the assembled legs of the tripod, whether via selectively attachable ball couplers 106" mounted to one or more sides of the leg at the optional threaded connection ports, or via more permanently attached ball couplers at one or more sides of the leg.

FIG. 6 also illustrates that proximal end coupler 112' at the proximal end of the tripod leg 102" may be a dual-mode coupler capable of serving as both a relatively large ball coupler and a relatively small socket coupler. To achieve this, the convexly and spherically contoured exterior surface 112a of the dual-mode coupler 112' has an outer diameter corresponding to a first ball size compatible with the relatively large socket couplers of the tripod yoke connection stubs 132, and a concavely and spherically contoured interior socket 112b that is open at the terminal end of the coupler 112' and has a smaller diameter corresponding to the ball size of the distal end ball couplers 106 of the earlier leg embodiments. This way, the dual-mode coupler 112' can be inserted into snap fit relation with a large socket coupler of the tripod yoke or another component, but can alternatively accept snap fit insertion of a small ball coupler 106 of another leg or other component. As shown, the dual-mode coupler 112' may have a male insertion member 150 to cooperatively form a secondary retention mechanism with a large socket coupler or small ball coupler having a female receiver space 156 with latching and release mechanisms 160, 162. A simplified tripod yoke for use with the simplified tripod leg may forgo the hinged connection stubs 132 of the earlier embodiment, and instead incorporate the sockets directly into the yoke hub for direct connection of the legs thereto.

In addition to potential use as a tripod leg, the FIG. 6 embodiment may be used as a tripod center column, a leg extension, selfie stick, or monopod. Use of the leg 102" as a tripod center column is shown in FIG. 3, where the leg 102" extends upwardly through the hub of the tripod yoke 104 to stand upright therefrom and hold the dual-mode coupler 112' in elevated relation thereabove. Here, the dual-mode coupler 112' can serve as a respective half of a ball mount, the cooperating half (not shown) of which is a camera base plate whose topside features a standardized thread shaft (e.g. ¼-20 screw) for threaded mounting of a camera thereto, and whose underside features either a large female socket for fitting over the ball shaped exterior of the dual-purpose coupler 112' of the center column, or a small male ball for insertion into the interior socket of the dual-purpose coupler 112' of the center column.

FIG. 6 shows a leg of fixed length, thereby demonstrating that although the earlier leg embodiments possess telescopic leg adjustability, the present invention is not limited to length-adjustable legs. The distal end of the leg 102" may be equipped with a small ball coupler 106 like those of the other leg embodiments for selective attachment of securement devices, spikes or other foot attachments with compatible socket joints, or may be equipped with a large socket coupler 113 like those of the yoke connectors 132 to enable multiple legs to be coupled together end-to-end to erect various support structures for cameras, lighting or other equipment. Each leg disclosed herein, having a generally shaft-like structure, whether formed of telescopically mated shaft sections enabling length adjustment of the shaft or a singular shaft of fix length, may likewise be used as a structural component for assembling various structures via the ball and joint couplers, and not just for assembling tripods. For example, the socket equipped yokes and legs may be used to assemble geodesic structures or other support structures of greater complexity than a three-legged tripod.

While the forgoing embodiments describe use of ball couplers at particular locations on particular components, and compatible socket couplers at corresponding locations on compatible components matable therewith, it will be appreciated that the particular distribution of the ball and socket couplers between the two compatible components may be reversed. In one non-limiting example, the tripod legs may have socket couplers at the distal ends thereof for mating with compatible ball couplers on the securement devices 10, instead of the reverse configuration depicted in the illustrated embodiments. Similarly, the tripod legs may have ball couplers at the proximal ends thereof for mating with compatible ball couplers on the tripod yoke, and the selectively attachable or permanently mounted couplers on the sides of the tripod legs be socket couplers rather than ball couplers, for mating with compatible ball couplers being provided on the compatible accessories or adapters.

The illustrated securement device embodiment in FIGS. 1 and 2 features magnetic embedments encapsulated within the outer skin 14. The outer skin may comprise multiple layers of varying material composition from one another, for example having a more flexible inner layer first applied over the spring band and embedments, followed by a less flexible outer layer overlying the first layer. The more flexible inner layer better accommodates the flexing of the spring band between its two stable states without cracking or tearing, while the more rigid, yet still flexible, outer layer of the skin provides improved durability at the exposed outermost surfaces of the device to reduce wear and tear.

Prototypes of the securement devices were produced by first bonding the embedments and the coupler-carrying stiffener to the spring band to thereby assemble an internal skeleton of the device. The skeleton was then immersed into an initially uncured first skin composition. A second immersion into a volume of an initially uncured second skin composition followed. When the respective compositions set into their final cured states, they respectively formed the more flexible inner skin layer and less flexible outer skin layer, both of which fully encapsulate the entirety of the skeleton, except at the open socket end of the socket coupler, where any excess skin material overlying or filling the socket was removed. The optional mesh reinforcement layer may be applied after the application of the first skin layer so as to only reinforce the less flexible outer layer, or separate reinforcement may be incorporated during application of each skin layer.

While the prototypes employed immersion-based skin application steps, production at a commercial level may apply alternative techniques, for example optionally using insert molding techniques where the initial skeleton is placed in a first mold to which the first skin composition is introduced to form the more flexible inner skin layer, followed by placement of the partially skinned skeleton in a larger second mold to which the second skin composition is introduced to form the less flexible outer skin layer.

While the securement devices illustrated in FIGS. 1 to 3 employ magnetic and fully encapsulated embedments as securement elements, thereby allowing magnetic retention on ferromagnetic objects in a non-marring manner leaving no damage to the object surfaces (e.g. vehicle surfaces) on which the devices are employed, other embodiments with non-magnetic embedments and/or exposed embedments are also contemplated within the scope of the present invention. In some alternatives, instead of fully encapsulated embedments, optionally overlaid with cup-frilled areas of the outer skin, the embedments may be only partially encapsulated in the outer skin. In one example, the embedments may be suction cup units having skin-embedded bases and non-embedded suction cups residing outside the skin for suction-cupped coupling of the securement device to sufficiently smooth surfaces or objects.

In another example, the embedments may be sharpened securement elements such as teeth or spike units similarly having bases thereof embedded in the skin, but with pointed tips thereof exposed outside the skin for pierced gripping of surfaces or objects for which marring is not a concern (e.g. rocks, trees, etc.). In such embodiments, the sharpened securement elements are preferably made of harder materials than the spring band, for example hardened materials such as tungsten carbide. In other embodiments, fully encapsulated yet non-magnetic embedments may be employed to serve as skin-encapsulated lugs imparting the non-uniform exterior profile at the embedment-equipped side(s) of the spring band for gripping purposes. Such lugs may be made of aluminum, various plastics or other materials. As an alternative to embedments of distinct material composition from the skin itself, the skin may be molded with a non-uniform thickness profile to create integral lugs rather than fully or partially encapsulated embedments.

Figure 8A:
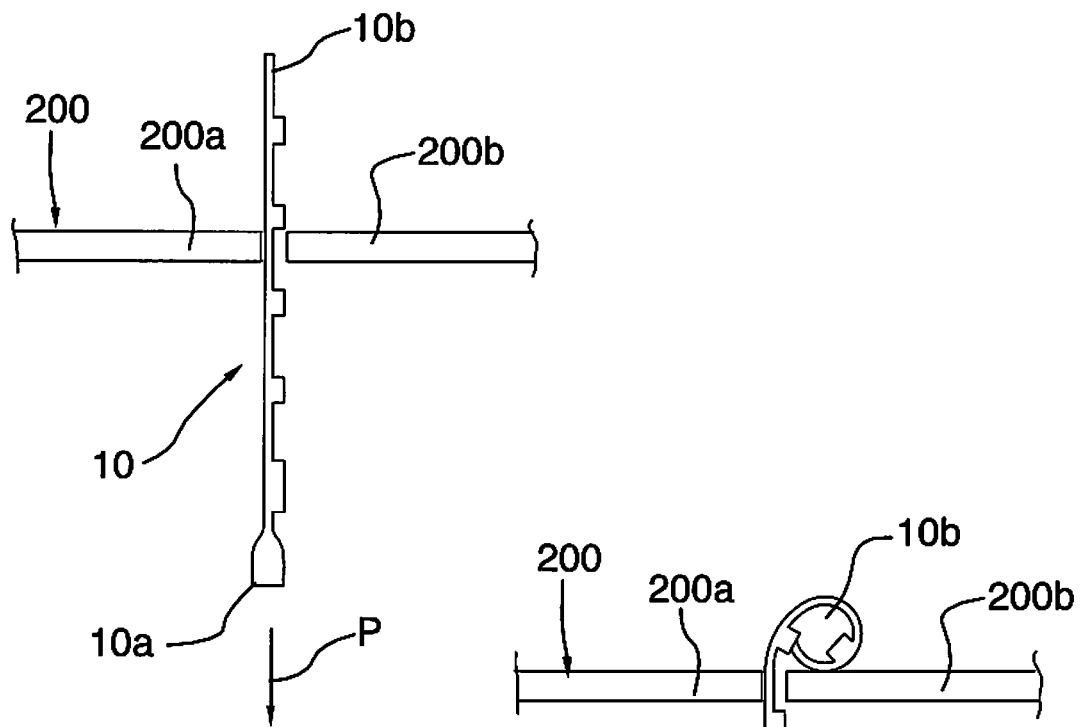
FIGS. 8A through 8C illustrate unique use of securement devices like those of FIGS. 1 and 2 to enable securement of an item or assembly to an object or structure at a gap or crack in said structure.

FIG. 8A shows one exemplary environment in which embedments, whether magnetic or not, are useful in securing a securement device 10 to an object or structure 200 having a crack or other gap between two parts 200a, 200b of the object or structure. The gap width exceeds the reduced thickness of the securement device at the thinner areas thereof between the embedment locations, but is less than the fuller thickness of the securement device at the embedment locations. Sliding of one of the thinner areas of the device into the gap in an insertion direction through an open end of the gap (into the plane of the page in FIG. 8A) thus places the securement device in an anchored position in which the distal end 10b of the device is blocked from being pulled out of the gap in a pulling direction P that is perpendicular to the insertion direction. Such pulling of the device from the gap is blocked by interference between one of the embedments and a boundary edge of the gap in the structure.

Figure 8B:
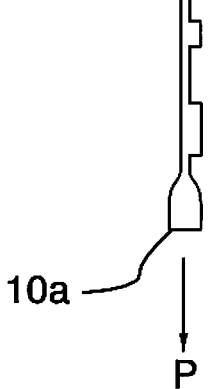

FIG. 8A shows the securement device anchored in the gap of the structure in its linear state. Further resistance to withdrawal of the securement device in the pulling direction can be provided by snapping at least part of the device out of its linear state so that the distal portion of the device on the side of the gap opposite the socket-equipped proximal end 10a of the device coils up on itself, as shown in FIG. 8B. Between the spring band's inherent resistance to unwinding of this coiled distal portion of the device, and the frictional contact between touching areas of the coiled distal portion's outer skin with itself and the structure, this coiled retention supplements the embedment-provided resistance to withdrawal of the device in the pulling direction P. The ability to snap select portions of the securement device out its linear state into its coiled state allows the securement device to conform into a variety of different overall shapes according to the surface or surfaces of an object or structure to which a user may wish to secure a tripod, monopod, or other support structure, whether for camera or lighting equipment or any other potential applications benefiting from such unique securement devices.

Figure 8C:
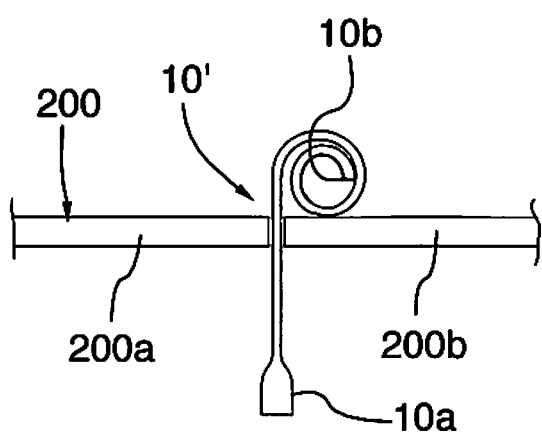

FIG. 8C illustrates similar use of an at least partially coiled state of an embedmentless securement device 10' to resist pulled withdrawal from the gap solely based solely on the unwinding resistance of the coiled portion and the frictional skin contact of the coiled portion with itself and the structure 200, thereby demonstrating the usefulness of skin-encapsulated spring band securement devices regardless of the inclusion or lack of embedments therein.

Figure 9:
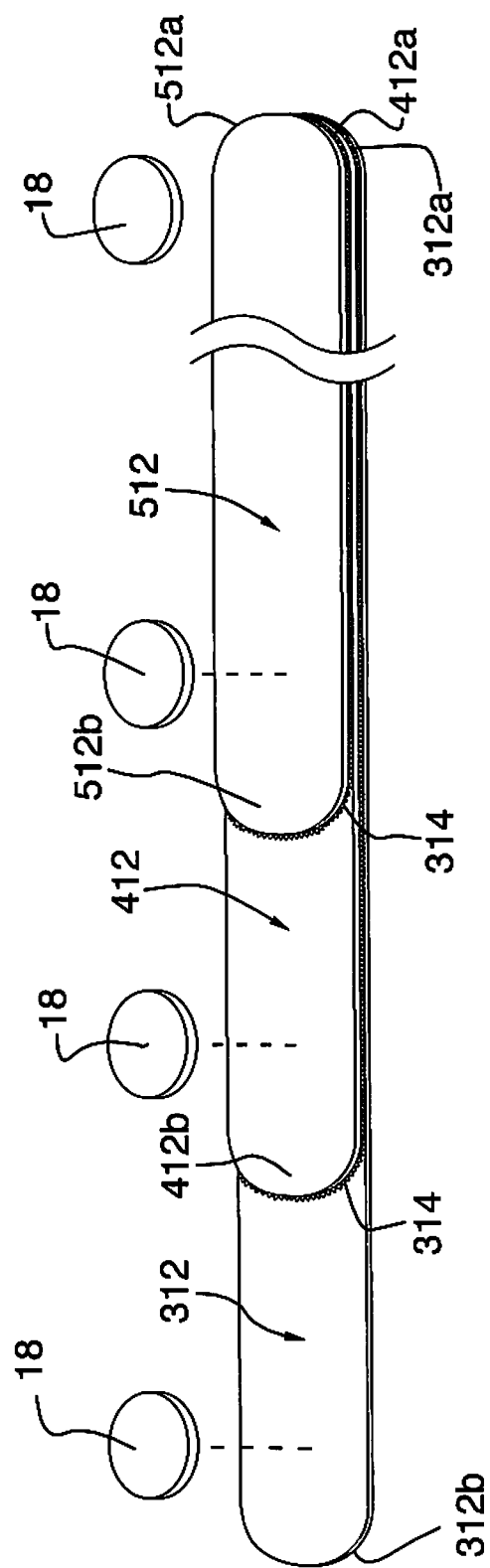
FIG. 9 illustrates assembly of a variant of the securement device of FIGS. 1 and 2, which employs multiple bi-stable spring bands in its construction.

FIG. 9 schematically illustrates assembly of another alternate embodiment of securement device, which instead of a singular spring band like the earlier embodiments, employs a plurality of spring bands in laminated relation to one another. The bands are all oriented in the same manner so that their convex-when-linear faces all face the same direction, and their concave-when-linear faces all face the same opposite direction. The multiple spring bands are encapsulated within a shared outer skin, which as described in the earlier embodiments may have be a multi-layer skin of varying composition and rigidity in each layer. Embedments 18 of any of the previously discussed types can once again be employed in fully or partially encapsulated fashion on the side of the device faced by the convex-when-linear sides of the multiple spring bands. FIG. 9 shows the example of a tri-band securement device with three spring bands, though the quantity of bands may be increased or decreased.

In the illustrated example, the spring bands 312, 412, 512 are of different length than one another, and are stacked in staggered relation to one another in the longitudinal direction. The illustrated bands are positioned to be co-terminus at their proximal ends 312a, 412a, 512a, where a socket coupler 22 may be connected during manufacture, for example via the previously described stiffener/dampener 24. However, due to the different band lengths, the distal ends 312b, 412b, 512b of the bands terminate at staggered intervals along the length of the overall securement device. The longest spring band 312 has a respective distal fraction of its convex-when-linear face exposed beyond the distal end 412b of the next longest spring band 412, which in turn has a distal fraction of its a respective distal fraction of its convex-when-linear face exposed beyond the distal end 512b of the next longest spring band 512, which in the tri-band embodiment is the shortest spring band.

The effective spring strength of the securement device is thus increased at areas thereof where the multiple springs overlap, while the distalmost portion of the securement device occupied by only the longest spring band possess the same spring properties as a single-band embodiment like that of FIGS. 1 and 2. Due to their laminated or stacked relation overlapping one another, the spring bands cannot be rigidly affixed together, as they need to have slightly different radii of curvature when in their coiled states. A relatively flexible connection between each adjacent pair of spring bands may be provided along the longitudinal and distal perimeter edges of all but the longest spring band via a suitably flexible bonding agent of polymeric or other suitable composition, as schematically represented in FIG. 9 by zig-zag lines 314. This way, the relative staggered positions of the bands are generally maintained, while some degree of longitudinal shifting is allowed between the bands to accommodate the different radii of curvatures in the coiled state of the bands. Preferably a thin layer of silica gel or other flowable but somewhat viscous substance is sandwiched between each pair of adjacent spring bands to avoid empty airspaces which could otherwise be permeated by moisture if the outer skin is punctured or torn, leading to potential corrosion of the springs.

FIG. 9 shows the spring bands during assembly of the securement device's internal skeleton, where the spring bands are laid out in their linear states and laminated together by application of the flexible bonding agent around the perimeter edges with the flowable viscous layers sandwiched between the bands. The optional embedments 18 are bonded to the convex-when-linear face of each band at one or more exposed areas thereof not obscured by an overlying spring band. Different embedments thus reside in overlying relation a different quantity of spring bands, as demonstrated in the FIG. 9 where the leftmost/distalmost embedment overlies only one spring band (i.e. the longest spring band 312 to which this embedment is bonded), the next leftmost/distalmost embedment overlies two spring bands (including the second longest or intermediate length spring band to which this embedment is bonded), and the remaining embedments all overlie all three spring bands (including the third longest or shortest spring band to which these embedments is bonded).

The stiffener/damper 24 and socket coupler 22 may be attached to the co-terminus proximal ends of the spring bands in the same manner described for earlier embodiments, followed by the application of one or more skin layers in the previously described manner. While the illustrated multi-band embodiment has its bands laid out in staggered fashion to provide variable spring action at different longitudinal regions of the device according to the different number of laminated springs occupying those particular areas, multi-band embodiments featuring multiple co-terminus bands of equal length are also within the scope of the present invention.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein:
the secondary retention mechanism comprises a male insertion member carried on a first one of the couplers and a female receiver located on a second one of the couplers into which the male insertion member is insertable to accomplish the engaged state of the secondary retention mechanism; and
at least a portion of the male insertion member is flexible to enable relative tilting between the couplings while the secondary retention mechanism is engaged.

2. The snap fit ball and socket joint of claim 1 wherein the secondary retention mechanism is arranged to automatically engage when the ball tip has been fully inserted into the receiving socket.

3. The snap fit ball and socket joint of claim 1 wherein the secondary retention mechanism comprises a manual release actuator operable to disengage the secondary retention mechanism and thereby enable separation of the couplers.

4. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein:
the secondary retention mechanism comprises a male insertion member carried on a first one of the couplers and a female receiver located on a second one of the couplers into which the male insertion member is insertable to accomplish the engaged state of the secondary retention mechanism; and
the male insertion member comprises an elongated element projecting from said first one of the couplers and at least one enlargement carried on said elongated element, and the female receiver comprises an opening in the second of the couplers that is sufficiently sized to accept insertion of the at least one enlargement through said opening.

5. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein:
the secondary retention mechanism comprises a male insertion member carried on a first one of the couplers and a female receiver located on a second one of the couplers into which the male insertion member is insertable to accomplish the engaged state of the secondary retention mechanism; and
the female receiver further comprises a latching mechanism movable between a closed position blocking withdrawal of the male insertion member from the female receiver, and an open position allowing withdrawal of the male insertion member from the female receiver.

6. The snap fit ball and socket joint of claim 5 wherein the latching mechanism comprises at least one latching member shaped to be automatically moved to the open position during insertion of the male insertion member into the female receiver.

7. The snap fit ball and socket joint of claim 1 wherein the secondary retention mechanism comprises a first retention feature and an accompanying second retention feature that provides a redundant failsafe to said first retention feature.

8. The snap fit ball and socket joint of claim 7 wherein the first and second retention features are arranged such that the second retention feature is operable to maintain connection between the couplers even after loss of the snap fit relation between the couplers.

9. The snap fit ball and socket joint of claim 4 wherein the least one enlargement comprises first and second enlargements, of which the second enlargement resides nearer a distal end of the elongated element than the first enlargement to provide a redundant failsafe in the event of inadvertent retraction of the first enlargement back through the opening of the female receiver.

10. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and a secondary retention mechanism operable to engage between the couplers when the ball tip is received in the socket coupler, thereby providing supplementary resistance to said separation of the couplers from one another;

wherein a first one of either the ball coupler or the socket coupler is provided on a tripod leg a second one of either the socket coupler or the ball coupler is provided on a tripod yoke to which said tripod leg is connected or connectable by said snap fit ball and socket joint.

11. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein a first one of either the ball coupler or the socket is provided on a tripod leg a second one of either the socket coupler or the ball coupler is provided on a tripod foot connected or connectable to said tripod leg by said snap fit ball and socket joint.

12. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein a first one of either the ball coupler or the socket is provided on a tripod center column or monopod, and a second one of either the socket coupler or the ball coupler is provided on a base plate that is connected or connectable to said center column or monopod by said snap fit ball and socket joint to create a ball head mount atop said center column or monopod.

13. A snap fit ball and socket joint comprising:
a ball coupler having a ball tip with a spherically contoured exterior surface;
a socket coupler having a spherically contoured receiving socket therein that is open at one end of the socket coupler to accept insertion of the ball tip of the ball coupler, wherein the couplers are dimensioned to provide a snap fit between said couplers as the ball tip is inserted into the receiving socket, whereby said snap fit resists withdrawal of the ball tip from the receiving socket, thereby resisting separation of the couplers from one another; and
a secondary retention mechanism operable to engage between the couplers when the ball tip is received in the socket coupler, thereby providing supplementary resistance to said separation of the couplers from one another;
wherein a first one of either the ball coupler or the socket is provided on a selfie-stick, and a second one of either the ball coupler or the socket is provided on an accompanying smartphone holder, whereby the smartphone holder is connected or connectable to said selfie-stick by said snap fit ball and socket joint.

\* \* \* \* \*